United States Patent
Akinaga et al.

(10) Patent No.: US 8,537,959 B2
(45) Date of Patent: Sep. 17, 2013

(54) DRAIN SUMP OF NUCLEAR REACTOR CONTAINMENT VESSEL

(75) Inventors: Makoto Akinaga, Kanagawa-ken (JP); Hiromasa Yanagisawa, Kanagawa-ken (JP); Hirohide Oikawa, Kanagawa-ken (JP); Ryoichi Hamazaki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 578 days.

(21) Appl. No.: 12/821,856

(22) Filed: Jun. 23, 2010

(65) Prior Publication Data
US 2010/0329409 A1 Dec. 30, 2010

(30) Foreign Application Priority Data
Jun. 25, 2009 (JP) .................................. 2009-151117

(51) Int. Cl.
*G21C 9/00* (2006.01)
(52) U.S. Cl.
USPC ............................ 376/277; 376/282; 376/293

(58) Field of Classification Search
USPC .................................................. 372/277–307
See application file for complete search history.

(56) References Cited

U.S. PATENT DOCUMENTS

| | | | | |
|---|---|---|---|---|
| 5,307,390 A | * | 4/1994 | Gou et al. ...................... | 376/280 |
| 5,867,548 A | * | 2/1999 | Bittermann et al. .......... | 376/280 |
| 2009/0080589 A1 | * | 3/2009 | Sato et al. ..................... | 376/280 |

* cited by examiner

*Primary Examiner* — Timothy A Brainard
(74) *Attorney, Agent, or Firm* — Foley & Lardner LLP

(57) ABSTRACT

A drain sump of a reactor containment vessel having a containment vessel floor down below a reactor pressure vessel, and includes a heat-proof sump cover and two or more drain flow paths. The drain sump is arranged inside the containment vessel floor. The heat-proof sump cover has a thickness, and covers an upper part of the drain sump. The thickness allows a top surface of the sump cover to lie in the same surface as a top surface of the containment vessel floor. The drain flow paths pass through the sump cover in a thickness direction to flow water therethrough and solidify a molten corium therein. The molten corium is produced in the unlikely event of a severe accident.

15 Claims, 7 Drawing Sheets

DRAIN SUMP OF NUCLEAR REACTOR CONTAINMENT VESSEL

CROSS REFERENCE TO RELATED APPLICATION

This application is based upon and claims the benefit of priority from the prior Japanese Patent Application No. 2009-151117, filed on Jun. 25, 2009, the entire contents of which are incorporated herein by reference.

FIELD

The present invention relates to a drain sump to collect leakage water inside a nuclear reactor containment vessel, particularly relates to a drain sump of a nuclear reactor containment vessel having a structure effective for preventing inflow of a molten corium and cooling the corium.

BACKGROUND

In a light-water reactor for a nuclear power plant, a reactor pressure vessel housing a core fuel is contained in a containment vessel in order to prevent outside leakage of radioactivity in the event of a nuclear accident. There could be a case for some reasons where water supply to the reactor pressure vessel stops, or piping connected to in the reactor pressure vessel breaks, leading to a loss of coolant therein. Even in such a case, multiply-provided emergency core cooling systems are enabled to automatically supply coolant to the reactor pressure vessel to fully cool down the core without damaging core fuels, thereby preventing a severe accident before happens.

Actually, also in such a light-water reactor, the overheating or melting of the core fuel is assumed although it is stochastically a very rare or unlikely case such that the above-mentioned multiply-provided emergency core cooling systems loss their functions.

If the systems deteriorate into such a grave crisis, a molten corium moves to a lower plenum of the reactor pressure vessel to settle thereon. If such a crisis persists for a long time, the lower head of the reactor pressure vessel melts to be penetrated so that the molten corium outflows into the containment vessel to settle on a containment vessel floor. The molten corium settled on the containment vessel floor melts and erodes a liner or a concrete included in the containment vessel, thereby leading to a risk of breaking boundaries of the containment vessel. In addition, noncondensable gases such as carbon dioxide and hydrogen, etc. are formed by the reaction of the molten corium with the concrete, and pressurize the inside of the containment vessel, thereby leading to a risk of breaking the boundaries thereof. A means to reduce the risks has been proposed which leads cooling water to an area of the containment vessel holding the molten corium to cool down the corium, thereby inhibiting the reaction of the corium with the concrete thereof.

At least, a drain sump is set up on the containment vessel floor to which the molten corium outflows from a reactor pressure vessel. The drain sump collects leakage water to possibly leak during plant operation, and detects water leakage. The water collected into the sump is pumped outside the containment vessel via piping using a pump on a top lid of the sump.

In the unlikely event of a reactor severe accident involving outflow of the molten corium to the outside of the containment vessel, the corium spreads on the containment vessel floor to possibly inflow and settle inside the drain sump. A drain water transport pump is mounted on a top lid of the drain sump, and water suction piping is connected to the pump from the inside of the drain sump. The pump and the piping could contact the molten corium which travels down from the pressure vessel. For this reason, if a water suction system melts to break owing to the molten corium traveling down, the corium easily flows into the sump. In this case, the molten corium in the sump will be substantially thicker than that in the containment vessel floor. This reduces capability of cooling down the molten corium, thereby leading to a risk of making it difficult to protect the containment vessel.

Then, an idea is proposed which covers the upper side of a drain sump with a protective barrier having a structure. The structure enables it to collect leakage water into the drain sump, but prevents the molten corium from flowing into the drain sump.

FIG. 7 is a sectional view showing a drain sump of a conventional reactor containment vessel proposed previously. In FIG. 7, a drain sump 103 is provided to a containment vessel floor 101 in contact with a pedestal wall 102, and the upper part of the drain sump is covered with a corium shield 107. The corium shield 107 includes upper and lower walls 104, 105 which extend vertically upwardly and vertically downwardly from the containment vessel floor, respectively, and further an upper roof 106. The upper wall 104 includes two or more flow paths 108 passing therethrough. The paths 108 have bottom faces having the same level as the containment vessel floor, and are separated from each other. The form of the flow paths is designed so that leakage water is led into the drain sump 103 and the molten corium 109 solidifies inside the flow paths 108 not to settle in the drain sump 103.

In the above-mentioned conventional drain sump, the corium shield 107 serves as a means to prevent the molten corium 109 from flowing into the drain sump 103, while it is necessary to make comparably larger the height and thickness of the upper wall 104 in order to solidify the molten corium in the flow paths 108 provided to the upside of the upper wall 104. Consequently, the area of the drain sump is taken from that of the containment vessel floor 101, thereby reducing a spreading area for the molten corium 109 settling on the containment vessel floor 101. That is, the whole area of the containment vessel floor 101 cannot be used fully to cool down the corium, because the effective area of the containment vessel floor 101 is reduced not only by the area of the drain sump 3 but also by the area of the corium shield 107. This situation makes it difficult to efficiently cool down the molten corium 109. Moreover, the molten corium 109 could not solidify inside the flow paths 108 formed in the upper wall 104 to flow into the drain sump 103.

BRIEF DESCRIPTION OF THE DRAWINGS

Aspects of this disclosure will become apparent upon reading the following detailed description and upon reference to the accompanying drawings. The description and the associated drawings are provided to illustrate embodiments of the invention and not limited to the scope of the invention.

DETAILED DESCRIPTION

Figure 1:
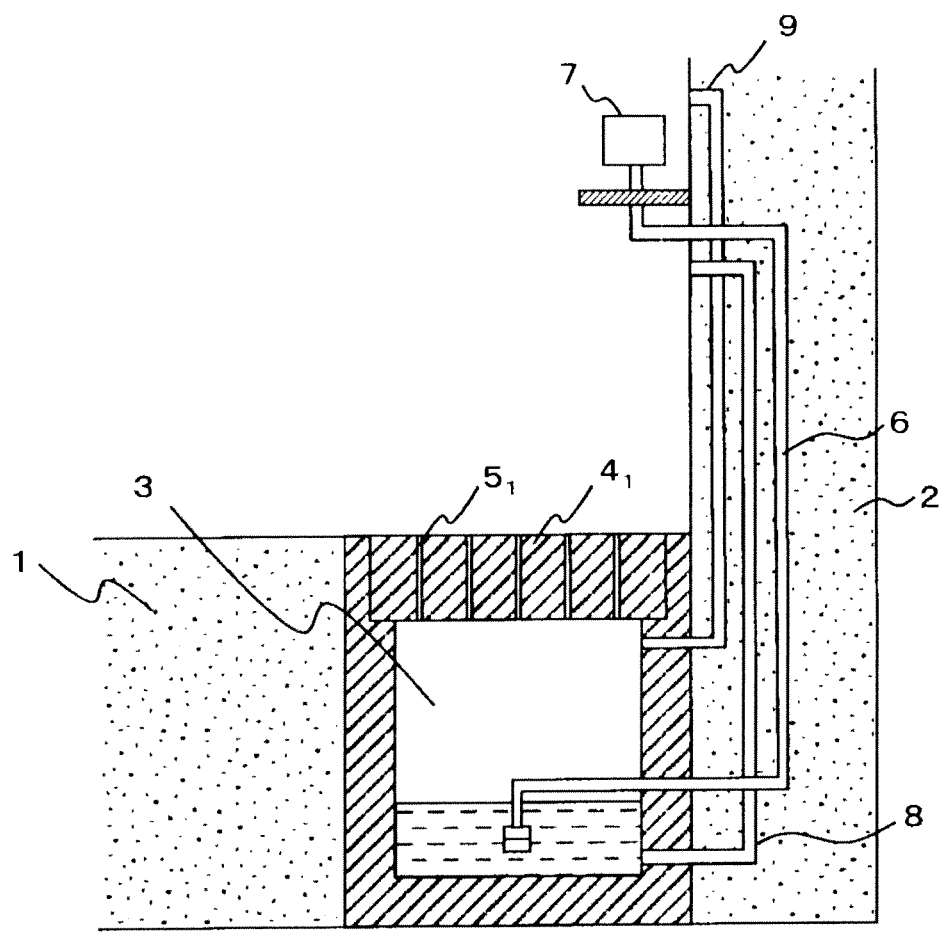
FIG. 1 is a sectional view showing a drain sump of a nuclear reactor containment vessel of a first embodiment.

Hereinafter, embodiments of a drain sump of a nuclear reactor containment vessel according to the invention are explained with reference to drawings. Wherever possible, the same reference numerals or marks will be used to denote the same or like portions throughout figures, and overlapped explanations are omitted in embodiments following a first embodiment.

First Embodiment

FIG. 1 is a sectional view showing a drain sump of a nuclear reactor containment vessel of a first embodiment. In the first embodiment, the drain sump 3 formed in a reactor containment vessel floor 1 is provided with two or more drain flow paths $5_1$ formed vertically, and the upper part of the drain sump 3 is covered with a heat-proof sump cover $4_1$ having a predetermined thickness. The top surface of the sump cover $4_1$ is in the same surface as that of the containment vessel floor 1. The drain flow paths $5_1$ do not make leakage water from around the reactor collect excessively on the containment vessel floor 1 to allow it to flow the water into the drain sump 3. The cross-sections or the lengths of the drain flow paths $5_1$ are properly made so as to solidify the molten corium inside the drain flow paths $5_1$ owing to heat conduction from the molten corium to the sump cover $4_1$ when the molten corium comes down to the containment vessel floor 1.

Water transport piping 6 is buried in a pedestal wall 2 to run from the drain sump 3 to a drain water transport pump 7. The pump 7, which transports the drain water collected in the drain sump 3 outside the containment vessel, is not placed on the sump cover $4_1$, but above the level where the pump 7 is not influenced by the molten corium. Drain sump submersion piping 8 is buried entirely in the pedestal wall 2 to open one end thereof to the bottom of the drain sump 3 and the other end thereof to the internal space of the containment vessel. The position of the other end is above the level of an assumed surface of the molten corium to be formed owing to meltdown of the whole core and settle on the containment vessel floor 1.

Furthermore, drain sump exhaust piping 9 is also buried entirely in the pedestal wall 2 to open one end thereof to the drain sump 3 and the other end thereof to the internal space of the containment vessel. The open end of the exhaust piping 9 in the drain sump 3 is above the level of the open end of the submersion piping 8 in the drain sump 3.

The pedestal wall 2 includes heatproof materials capable of resisting thermal damage from the molten corium, in which the sump cover $4_1$, drain water transport piping 6, the drain sump submersion piping 8 and the exhaust piping 9 is buried. For example, the constructional material of the sump cover $4_1$ includes alumina, zirconia, etc.

In the unlikely event of a serious accident such that the molten corium melts to penetrate the bottom of the reactor vessel and falls down to spread on the containment vessel floor 1 to settle on the drain sump 3, the molten corium flows into the drain flow paths $5_1$ formed in the sump cover $4_1$. The molten corium solidifies inside the drain flow paths $5_1$ during the inflowing thereof owing to heat conduction from the corium to the sump cover $4_1$, thereby not traveling down to the drain sump 3.

In addition, when cooling water is injected into the containment vessel in order to cool down the molten corium settled on the containment vessel floor 1, pool water accumulates on the corium settled in the containment vessel and flows down to the drain sump 3 via the drain sump submersion piping 8. Then, the gas in the drain sump 3 is evacuated therefrom via the exhaust piping 9. Even in the unlikely event such that the molten corium has flowed into the drain sump 3, the molten corium settled inside the drain sump 3 can be cooled down with cooling water collected in the drain sump 3. Then, the sump cover $4_1$ can be also cooled down from its bottom surface with the cooling water in the drain sump 3.

This prevents the molten corium from flowing into the drain sump 3, and the molten corium spreads also on the drain sump cover $4_1$, thereby allowing it to use the surface area of the drain sump 3 with the drain sump cover $4_1$ thereon in order to cool down the molten corium. In other words, the whole floor of the containment vessel can be used to cool down the molten corium. Also in the unlikely event such that the molten corium has flowed into the drain sump 3, the molten corium can be cooled down.

Second Embodiment

Figure 2:
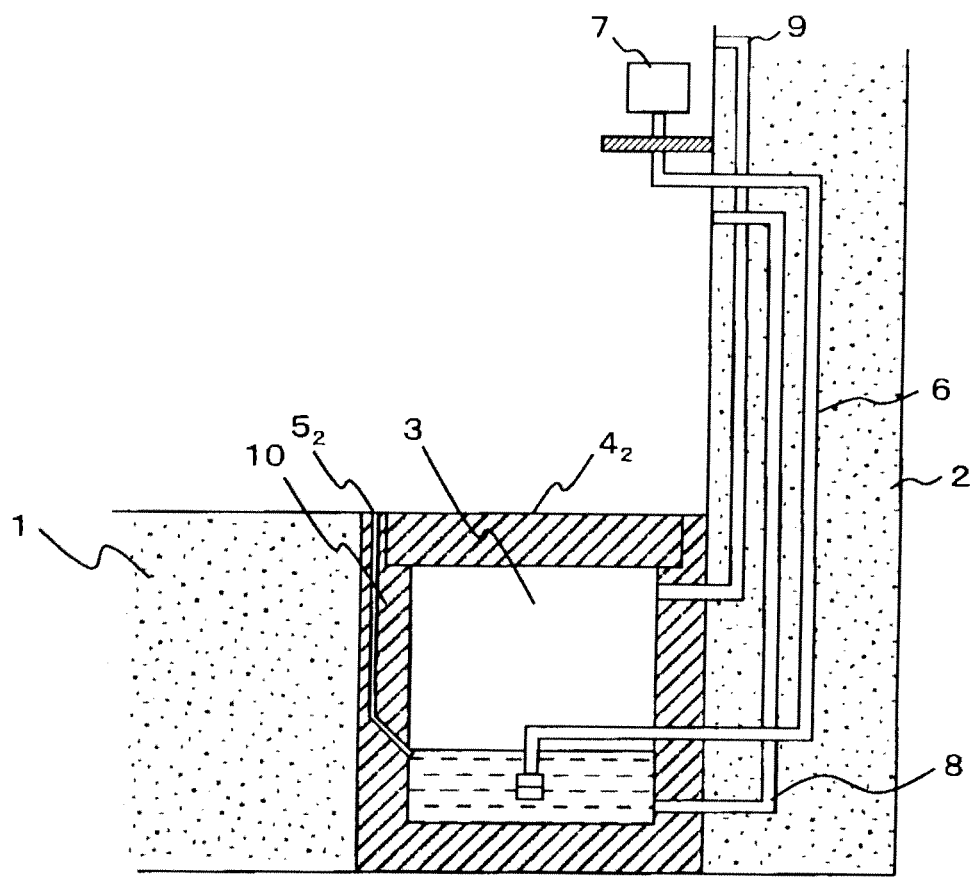
FIG. 2 is a sectional view showing a drain sump of a nuclear reactor containment vessel of a second embodiment.

FIG. 2 is a sectional view showing a drain sump of a nuclear reactor containment vessel of a second embodiment. In the second embodiment, the top part of the drain sump 3 formed in the reactor pressure vessel floor 1 is covered with a heat-proof sump cover $4_2$. A sump sidewall 10 formed in the containment vessel floor 1 has two or more drain flow paths $5_2$. One end of the drain flow path $5_2$ is opened to the internal space of the containment vessel and the other end thereof is opened to the internal space of the drain sump 3. The top surface of the sump cover $4_2$ is in the same surface as that of the containment vessel floor 1, while the sump cover $4_2$ is not provided with the drain paths as well as in the first embodiment.

In the unlikely event of a serious accident, the molten corium having flowed out of the containment vessel spreads to settle on the containment vessel floor 1 including the drain sump 3, and flows into the drain flow paths $5_2$ of the sump sidewall 10. Then the molten corium solidifies inside the drain flow paths $5_2$ owing to heat conduction from the corium to the sump sidewall 10, thereby not flowing into the drain sump 3.

This prevents the molten corium from flowing into the drain sump 3, and simultaneously makes the molten corium spread also on the drain sump cover $4_2$, thereby allowing it to use the surface area of the drain sump 3 to cool down the molten corium. In other words, the whole floor of the containment vessel can be used to cool down the molten corium. Also in the unlikely event such that the molten corium has flowed into the drain sump 3, the molten corium can be cooled down.

A drain sump submersion piping 8, a drain sump exhaust piping 9, a drain water transport piping 6 and a drain water transport pump 7 are provided to the drain sump of the second embodiment as well as in the first embodiment. These piping systems are provided in embodiments 3 to 6 as well.

In the first embodiment, it is required to thicken the sump cover $4_1$ in order to solidify the molten corium inside the drain flow paths $5_1$. Therefore, it is required to thicken the containment vessel floor 1 in order to give a certain volume to the drain sump 3. In the second embodiment, the sump cover $4_2$ is not provided with the drain flow paths, and it is, therefore, not required to thicken the containment vessel floor 1. In this respect, embodiments 3 to 6 have the same advantage as the second embodiment, as described below.

Third Embodiment

Figure 3A:
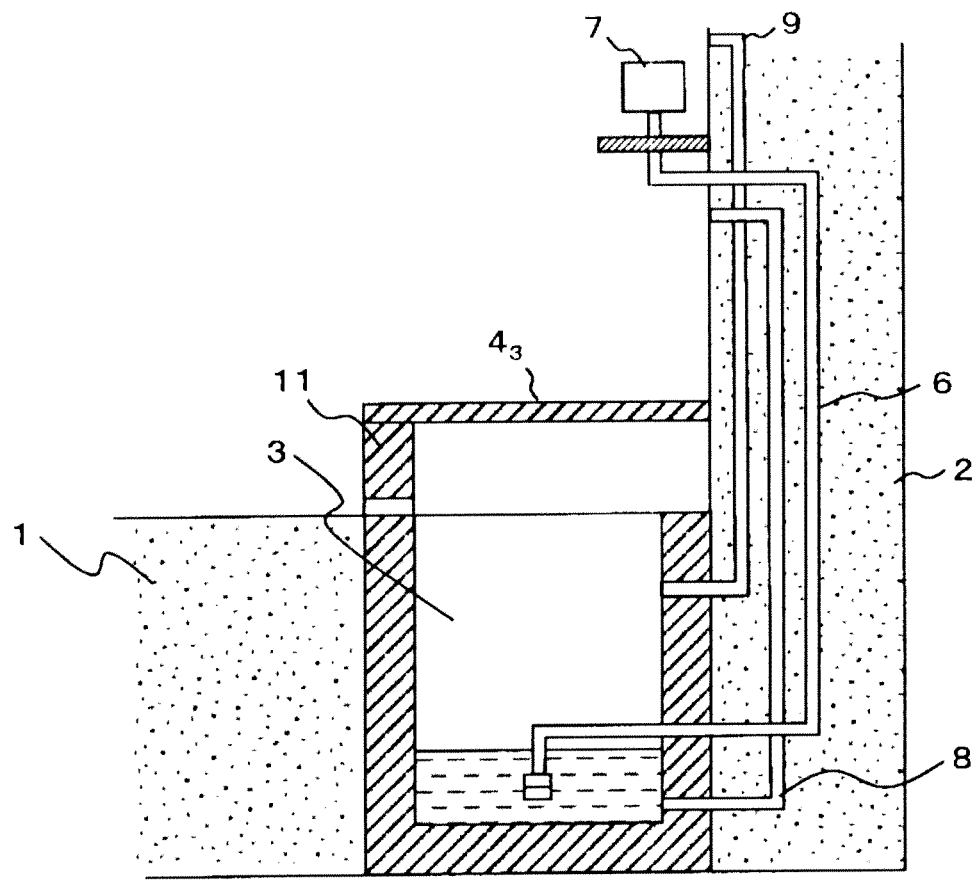
FIG. 3A is a sectional view wholly showing a nuclear reactor containment vessel drain sump of a third embodiment.
Figure 3B:
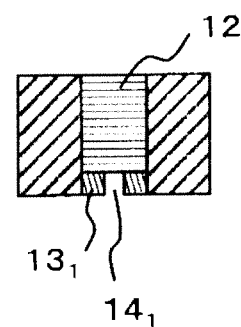
FIG. 3B is an enlarged view of a barrage in FIG. 3A.

FIG. 3A is a sectional view wholly showing a drain sump of a nuclear reactor containment vessel of a third embodiment. FIG. 3B is an enlarged view showing a barrage 11 in FIG. 3A.

In the third embodiment, a drain sump 3 formed in the containment vessel floor 1 is provided with a heat-proof barrage 11 and a heat-proof sump cover $4_3$. The heat-proof barrage 11 is placed on the containment vessel floor 1 surrounding the upper part of the drain sump 3, and the sump cover $4_3$ supported by the barrage covers the upper part of the drain sump 3. The barrage 11 is provided with a heat-proof gate 12 to be vertically movable. The gate is supported by supporting members $13_1$ including a low-melting point material with a drain hole $14_1$ which serves as a drain flow path.

The drain sump of the third embodiment is constituted as mentioned above so that leakage water to possibly leak during plant operation is collected into the drain sump 3 via the drain hole $14_1$. In the unlikely event of a severe accident involving pressure vessel breaks, the molten corium comes near the drain sump 3 to melt the supporting members $13_1$, thereby making the heat-proof gates 12 fall down to close the drain hole $14_1$.

This can prevent the molten corium from intruding into the drain sump 3, thereby allowing it to properly cool down the molten corium settling on the containment vessel floor 1. The thickness of the barrage 11 can be minimized so that the area of the containment vessel floor to cool down the molten corium is not reduced significantly.

Fourth Embodiment

Figure 4:
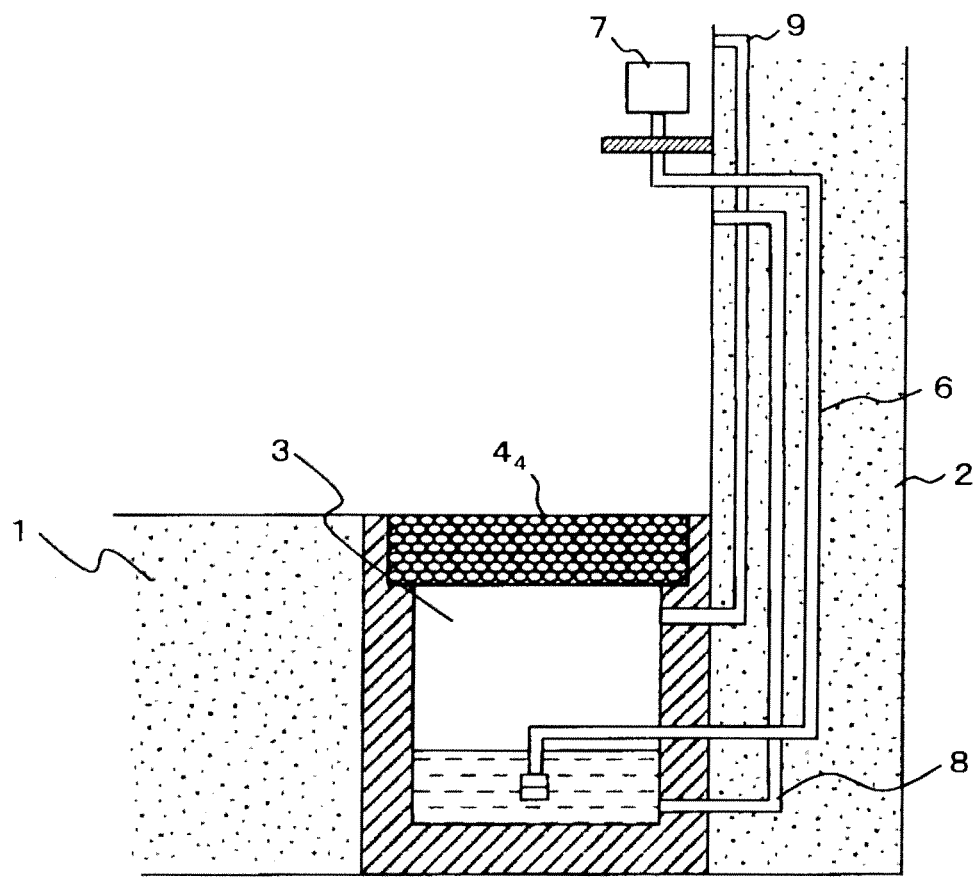
FIG. 4 is a sectional view showing a drain sump of a nuclear reactor containment vessel of a fourth embodiment.

FIG. 4 is a sectional view showing a drain sump of a nuclear reactor containment vessel of a fourth embodiment. The top surface of a sump cover $4_4$ is in the same surface as that of the containment vessel floor 1. The sump cover $4_4$ includes heat-proof rubble which is bedded to have a prescribed thickness.

The drain sump of the fourth embodiment is constituted as mentioned above so that leakage water to possibly leak during plant operation is collected into the drain sump 3 via gaps of the rubble forming the sump cover $4_4$. In the unlikely event of a severe accident involving pressure vessel breaks, the molten corium spreads on the containment vessel floor 1 to further outflow also onto the sump cover $4_4$, but never flow down to the inside of the drain sump 3. The rubble forming the sump cover $4_4$ includes broken pieces whose material is similar to that of the sump cover $4_1$ in the first embodiment. The size of the broken pieces makes the molten corium solidify on the way down to the drain sump 3 via cracks or gaps of the broken pieces included in the sump cover $4_4$.

Moreover, the drain sump 3 is designed to ready have a certain amount of water therein. In the unlikely event such that the molten corium has flowed into the drain sump 3, cooling water stored in the drain sump 3 cools down the molten corium inside the drain sump 3 to prevent the molten corium from settling thick inside the drain sump 3.

This allows the molten corium to spread also on the sump cover $4_4$, thereby allowing it to use the area of the sump cover $4_4$ to cool down the molten corium. In other words, the whole floor of the containment vessel can be used to cool down the molten corium.

Fifth Embodiment

Figure 5A:
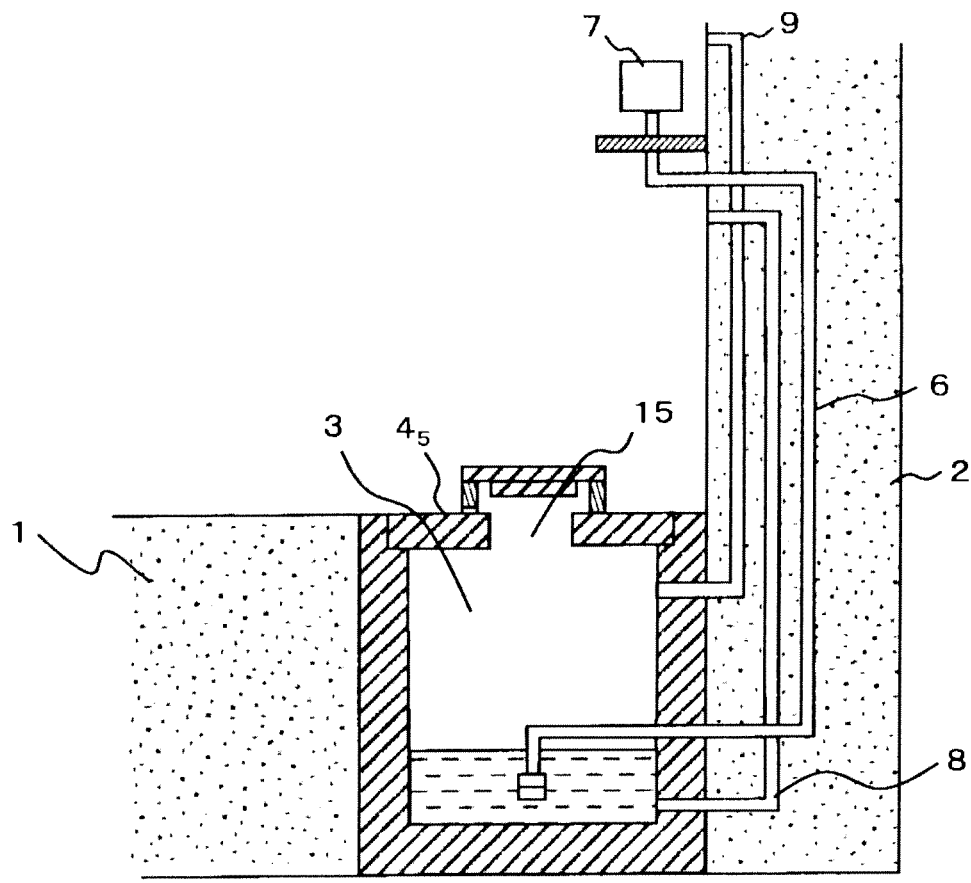
FIG. 5A is a sectional view wholly showing a drain sump of a nuclear reactor containment vessel of a fifth embodiment.
Figure 5B:
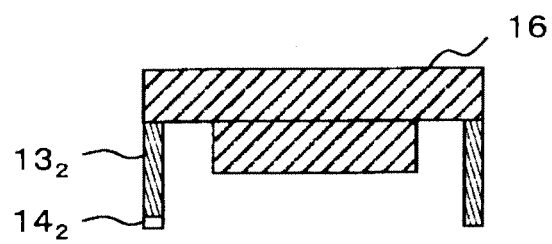
FIG. 5B is an enlarged view showing a lid of a drain sump in FIG. 5A.

FIG. 5A is a sectional view wholly showing a drain sump of a nuclear reactor containment vessel of a fifth embodiment. FIG. 5B is an enlarged view showing a lid 16 of a drain sump 3 in FIG. 5A.

In the fifth embodiment, the upper part of the drain sump 3 is covered with a heat-proof sump cover 4 having an opening 15. The top surface of the sump cover $4_5$ is in the same surface as that of the containment vessel floor 1. A lid 16 is mounted on the opening 15, and is supported by supporting members $13_2$ including a low-melting point material. One of the supporting members is provided with a drain hole $14_2$ as a drain flow path.

The drain sump of the fifth embodiment is constituted as mentioned above so that water to possibly leak during plant operation is drained into the drain sump 3 via a drain hole $14_2$. In the unlikely event of a severe accident involving breaks of the pressure vessel, the molten corium spreads on the upper surface of the containment vessel floor 1 to further flow on the sump cover $4_5$. When the molten corium comes near the supporting members $13_2$ including a low-melting point material, the supporting members $13_2$ melt so that the heat-proof lid 16 falls down to close up the opening of the sump cover $4_5$ therewith. Alternatively, the lid 16 may be designed to have the top surface thereof in the same surface as that of the sump cover 4 when the lid 16 falls down. This prevents the molten corium from intruding into the drain sump 3, thereby allowing it to properly cool down the molten corium settling on the containment vessel floor.

Sixth Embodiment

Figure 6:
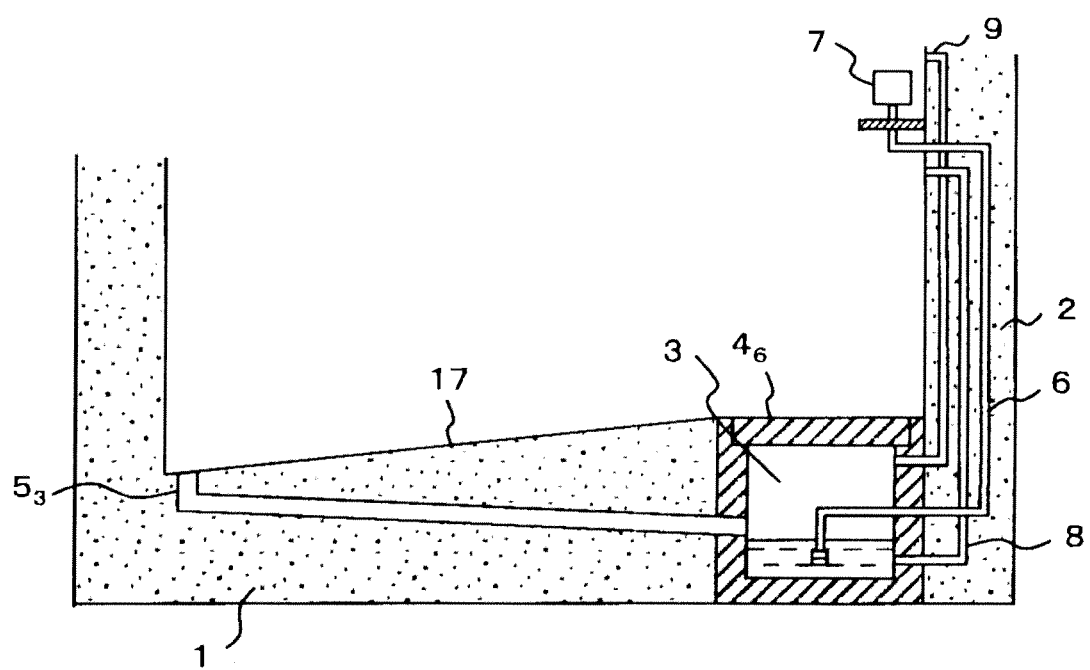
FIG. 6 is a sectional view showing a drain sump of a nuclear reactor containment vessel of a sixth embodiment.
Figure 7:
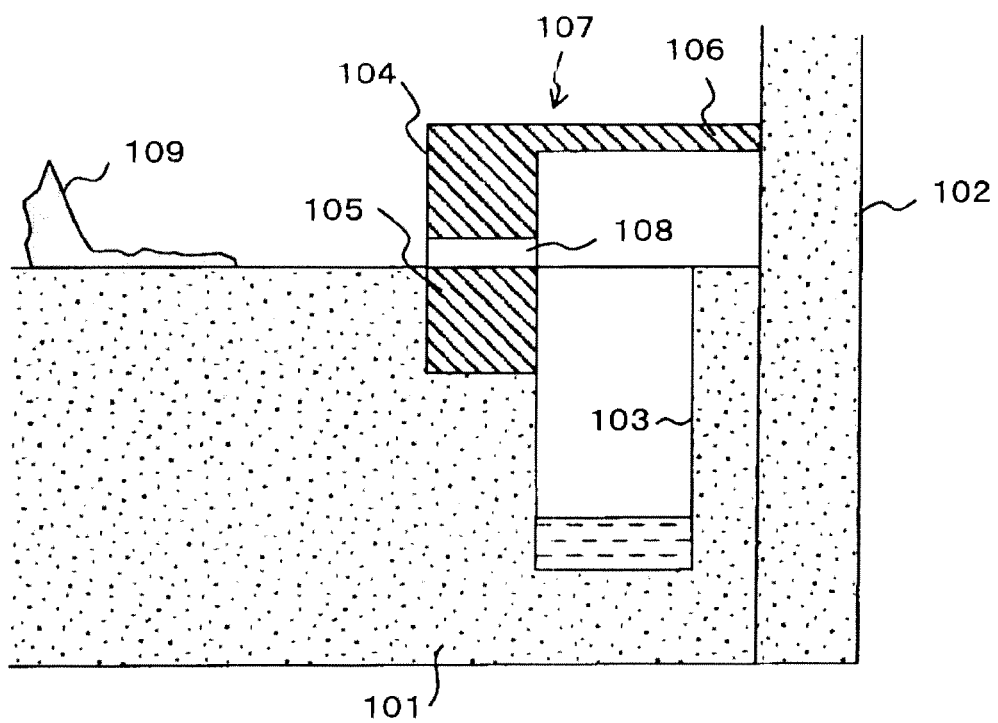
FIG. 7 is a sectional view showing a drain sump of a conventional reactor containment vessel proposed previously.

FIG. 6 is a sectional view showing a drain sump of a nuclear reactor containment vessel of a sixth embodiment. In the sixth embodiment, the upper part of the drain sump 3 is covered with a heat-proof sump cover $4_6$. A containment vessel floor 17 has a slope downward from the side of the drain sump 3 toward the other side without the drain sump 3. A drain flow path $5_3$ is buried in the containment vessel floor 17. Two ends of the drain flow path $5_3$ are open to the other side without the drain sump 3 and the inside of the drain sump 3.

The drain sump of the sixth embodiment is constituted as mentioned above so that leakage water to possibly leak during plant operation is collected into the drain sump 3 via the drain flow path $5_3$. In the unlikely event of a severe accident involving pressure vessel breaks, the molten corium having come down to the containment vessel floor 17 flows down on the slope to flow into the drain flow path $5_3$. The molten corium travels inside the drain flow path $5_3$ to solidify on the way to the drain sump 3. The floor 17 with the slope prevents the molten corium from settling thick in the drain sump 3, thereby allowing it to properly cool down the molten corium settling on the containment vessel floor.

In addition, it has been mentioned repeatedly in the embodiments 1, 2, 4 and 5 that the top surface of the sump cover is in the same surface as that of the containment vessel floor 1, but does not mean excluding some steps or slopes from the containment vessel floor which are necessary for sufficient spreading of the molten corium. In other words, the containment vessel floor may include some steps or slopes, provided that the steps or slopes do not make the molten corium settle thickly locally thereon, and the containment vessel floor is given a sufficient area to efficiently cool down the molten corium. Forms of the drain flow paths are not limited to the forms specified in the above-described embodiments, and may be stepwise, for example. The number of the drain flow paths may be tailored properly.

As described above, according to the first embodiment, a drain sump of a reactor containment vessel has a containment vessel floor down below a reactor pressure vessel in the containment vessel, and includes a heat-proof sump cover and a drain flow path. The drain sump is arranged inside the containment vessel floor. The heat-proof sump cover has a thickness, and covers an upper part of the drain sump. The thickness allows a top surface of the sump cover to be in the same surface as a top surface of the containment vessel floor. The drain flow paths pass through the sump cover in a thickness direction to flow water therethrough and solidify a molten corium therein. The molten corium is produced in the unlikely event of a severe accident.

As described above, according to the second embodiment, a drain sump of a reactor containment vessel has a containment vessel floor down below a reactor pressure vessel in the containment vessel, and includes a heat-proof sump cover, a sidewall, and a drain flow path. The drain sump is arranged inside the containment vessel floor. The heat-proof sump cover which covers an upper part of the drain sump has a top surface. The top surface of the sump cover is in the same surface as a top surface of the containment vessel floor. The drain flow paths formed in the sidewall flow water therethrough and solidify a molten corium therein. The molten corium is produced in the unlikely event of a severe accident.

As described above, according to the third embodiment, a drain sump of a reactor containment vessel has a containment vessel floor down below a reactor pressure vessel in the containment vessel, and includes a heat-proof sump cover, a heat-proof barrage, and a heat-proof gate. The drain sump is arranged inside the containment vessel floor. The heat-proof sump cover which covers an upper part of the drain sump has a top surface. The top surface of the sump cover is in the same surface as a top surface of the containment vessel floor. The heat-proof barrage surrounds an upper part of the drain sump, and is formed on the containment vessel floor to support the sump cover. The heat-proof gate is provided to the barrage and supported by supporting members including a low-melting point material. The supporting members are provided with drain holes to flow water therethrough. The drain holes are closed up by a fall of the gate when a molten corium comes near the supporting members. The molten corium is produced in the unlikely event of a severe accident.

As described above, according to the fourth embodiment, a drain sump of a reactor containment vessel has a containment vessel floor down below a reactor pressure vessel in the containment vessel, and includes a heat-proof sump cover. The heat-proof sump cover has a thickness to cover an upper part of the drain sump, and includes heat-proof rubble. The rubble flows water therethrough, and solidifies a molten corium therein. The molten corium is produced in the unlikely event of a severe accident. In addition, the drain sump is arranged inside the containment vessel floor.

As described above, according to the fifth embodiment, a drain sump of a reactor containment vessel has a containment vessel floor down below a reactor pressure vessel in the containment vessel, and includes a heat-proof sump cover. The drain sump is arranged inside the containment vessel floor. The heat-proof sump cover has a top surface to cover an upper part of the drain sump and an opening. The top surface of the heat-proof sump cover is in the same surface as a top surface of the containment vessel floor. The opening is provided with a lid. The lid is supported by supporting members including a low-melting point material and having a drain hole to flow water therethrough. The supporting members melt to close up the drain hole when a molten corium comes near the supporting members. The molten corium is produced in the unlikely event of a severe accident.

While certain embodiments of the invention have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A drain sump of a nuclear reactor containment vessel having a containment vessel floor down below a reactor pressure vessel in the containment vessel, comprising:
   a heat-proof sump cover having a thickness to cover an upper part of the drain sump, the thickness allowing a top surface of the sump cover to be in a same surface as a top surface of the containment vessel floor; and
   a plurality of drain flow paths passing through the sump cover in a thickness direction to flow water therethrough and solidify a molten corium therein, the molten corium being produced in an unlikely event of a severe accident,
   wherein the drain sump is arranged inside the containment vessel floor, and
   wherein the top surface of the containment vessel floor comprises portions that are not part of the sump cover.

2. The drain sump according to claim 1, further comprising:
   transport piping buried in a pedestal wall of the reactor pressure vessel to transport drain water inside the drain sump to an outside of the containment vessel, the drain water being leakage water collected during plant operation; and
   a drain-water transport pump to be connected to the piping and located above a level which a surface of a molten corium settling on the containment vessel floor reaches, the molten corium being produced in an unlikely event of a severe accident.

3. The drain sump according to claim 1, further comprising:
   submersion piping being buried in a pedestal wall of the reactor pressure vessel and having two open ends,
   wherein one of the two open ends is opened to an internal space of the drain sump and the other of the two open ends is opened to the containment vessel above a level which a surface of a molten corium settling on the containment vessel floor reaches, the molten corium being produced in an unlikely event of a severe accident.

4. A drain sump of a nuclear reactor containment vessel having a containment vessel floor down below a reactor pressure vessel in the containment vessel, comprising:
   a heat-proof sump cover which covers an upper part of the drain sump, the sump cover having a top surface, the top surface being in a same surface as a top surface of the containment vessel floor;
   a sidewall; and
   a plurality of drain flow paths formed in the sidewall to flow water therethrough and solidify a molten corium therein, the drain flow paths having open ends which are opened to internal spaces of the containment vessel and the drain sump, the molten corium being produced in an unlikely event of a severe accident, wherein the drain sump is arranged inside the containment vessel floor, and wherein the top surface of the containment vessel floor comprises portions that are not part of the sump cover.

5. The drain sump according to claim 4, further comprising:

transport piping buried in a pedestal wall of the reactor pressure vessel to transport drain water inside the drain sump to an outside of the containment vessel, the drain water being leakage water collected during plant operation; and a drain-water transport pump to be connected to the piping and located above a level which a surface of a molten corium settling on the containment vessel floor reaches, the molten corium being produced in an unlikely event of a severe accident.

6. The drain sump according to claim 4, further comprising:

submersion piping being buried in a pedestal wall of the reactor pressure vessel and having two open ends, wherein one of the two open ends is opened to an internal space of the drain sump and the other of the two open ends is opened to the containment vessel above a level which a surface of a molten corium settling on the containment vessel floor reaches, the molten corium being produced in an unlikely event of a severe accident.

7. A drain sump of a nuclear reactor containment vessel having a containment vessel floor down below a reactor pressure vessel in the containment vessel, comprising:

a heat-proof sump cover to cover an upper part of the drain sump, the sump cover having a top surface which is in a same surface as a top surface of the containment vessel floor;

a heat-proof barrage surrounding an upper part of the drain sump to be formed on the containment vessel floor and support the sump cover; and a heat-proof gate provided to the barrage to be supported by supporting members including a low-melting point material, the supporting members being provided with a drain hole to flow water therethrough, the drain hole being closed up by a fall of the gate when a molten corium comes near the supporting members, the molten corium being produced in an unlikely event of a severe accident, wherein the drain sump is arranged inside the containment vessel floor.

8. The drain sump according to claim 7, further comprising:

transport piping buried in a pedestal wall of the reactor pressure vessel to transport drain water inside the drain sump to an outside of the containment vessel, the drain water being leakage water collected during plant operation; and a drain-water transport pump to be connected to the piping and located above a level which a surface of a molten corium settling on the containment vessel floor reaches, the molten corium being produced in an unlikely event of a severe accident.

9. The drain sump according to claim 7, further comprising:

submersion piping being buried in a pedestal wall of the reactor pressure vessel and having two open ends, wherein one of the two open ends is opened to an internal space of the drain sump and the other of the two open ends is opened to the containment vessel above a level which a surface of a molten corium settling on the containment vessel floor reaches, the molten corium being produced in an unlikely event of a severe accident.

10. A drain sump of a nuclear reactor containment vessel having a containment vessel floor down below a reactor pressure vessel in the containment vessel, comprising:

a heat-proof sump cover having a thickness to cover an upper part of the drain sump and including heat-proof rubble, the thickness allowing a top surface of the sump cover to be in a same surface as a top surface of the containment vessel floor, the rubble flowing water therethrough and solidifying a molten corium therein, the molten corium being produced in an unlikely event of a severe accident, wherein the drain sump is arranged inside the containment vessel floor.

11. The drain sump according to claim 10, further comprising:

transport piping buried in a pedestal wall of the reactor pressure vessel to transport drain water inside the drain sump to an outside of the containment vessel, the drain water being leakage water collected during plant operation; and a drain-water transport pump to be connected to the piping and located above a level which a surface of a molten corium settling on the containment vessel floor reaches, the molten corium being produced in an unlikely event of a severe accident.

12. The drain sump according to claim 10, further comprising:

submersion piping being buried in a pedestal wall of the reactor pressure vessel and having two open ends, wherein one of the two open ends is opened to an internal space of the drain sump and the other of the two open ends is opened to the containment vessel above a level which a surface of a molten corium settling on the containment vessel floor reaches, the molten corium being produced in an unlikely event of a severe accident.

13. A drain sump of a nuclear reactor containment vessel having a containment vessel floor down below a reactor pressure vessel in the containment vessel, comprising:

a heat-proof sump cover having a top surface to cover an upper part of the drain sump and an opening, the top surface being in a same surface as a top surface of the containment vessel floor, the opening being provided with a lid, the lid being supported by supporting members including a low-melting point material and having a drain hole to flow water therethrough, the supporting members melting to close up the drain hole when a molten corium comes near the supporting members, the molten corium being produced in an unlikely event of a severe accident, wherein the drain sump is arranged inside the containment vessel floor.

14. The drain sump according to claim 13, further comprising:

transport piping buried in a pedestal wall of the reactor pressure vessel to transport drain water inside the drain sump to an outside of the containment vessel, the drain water being leakage water collected during plant operation; and a drain-water transport pump to be connected to the piping and located above a level which a surface of a molten corium settling on the containment vessel floor reaches, the molten corium being produced in an unlikely event of a severe accident.

15. The drain sump according to claim 13, further comprising:

submersion piping being buried in a pedestal wall of the reactor pressure vessel and having two open ends,
wherein one of the two open ends is opened to an internal space of the drain sump and the other of the two open ends is opened to the containment vessel above a level which a surface of a molten corium settling on the containment vessel floor reaches, the molten corium being produced in an unlikely event of a severe accident.

\* \* \* \* \*